United States Patent
Jones

(10) Patent No.: US 7,019,795 B2
(45) Date of Patent: Mar. 28, 2006

(54) LIQUID CRYSTAL DEVICE OPERABLE IN TWO MODES AND METHOD OF OPERATING THE SAME

(75) Inventor: John C. Jones, Malvern (GB)

(73) Assignee: ZBD Displays Ltd, Worcestershire (GB)

(*) Notice: Subject to any disclaimer, the term of this patent is extended or adjusted under 35 U.S.C. 154(b) by 128 days.

(21) Appl. No.: 10/481,430

(22) PCT Filed: Jun. 20, 2002

(86) PCT No.: PCT/GB02/02924

§ 371 (c)(1),
(2), (4) Date: Dec. 22, 2003

(87) PCT Pub. No.: WO02/103666

PCT Pub. Date: Dec. 27, 2002

(65) Prior Publication Data

US 2004/0141107 A1    Jul. 22, 2004

(30) Foreign Application Priority Data

Jun. 20, 2001    (GB) ................................... 0114998

(51) Int. Cl.
  *G02F 1/1333*    (2006.01)
  *G02F 1/1347*    (2006.01)
  *C09K 19/02*    (2006.01)

(52) U.S. Cl. ........................... 349/33; 349/77; 349/172; 349/184

(58) Field of Classification Search ................. 349/33, 349/77, 171, 172, 184; 345/87, 89, 97
See application file for complete search history.

(56) References Cited

U.S. PATENT DOCUMENTS

| 5,995,173 A | 11/1999 | Barberi et al. ................. 349/33 |
| 6,714,273 B1* | 3/2004 | Bryan-Brown et al. ..... 349/129 |
| 2005/0001972 A1* | 1/2005 | Roosendaal et al. ........ 349/179 |

FOREIGN PATENT DOCUMENTS

| WO | WO 97/14990 | 4/1997 |
| WO | 98/04953 A1 | 2/1998 |
| WO | WO 99/34251 | 7/1999 |

* cited by examiner

*Primary Examiner*—Tarifur R. Chowdhury
(74) *Attorney, Agent, or Firm*—Nixon & Vanderhye P.C.

(57) ABSTRACT

A liquid crystal device is provided that comprises a layer of liquid crystal material (2) disposed between two cell walls (4, 6) in an arrangement such that the liquid crystal material (2) can adopt any one of two or more stable liquid crystal configurations that will persist in the absence of an applied electric field. The liquid crystal device is operable in two modes; a first mode in which application of an appropriate latching voltage pulse can select any one of the two or more stable liquid crystal configurations, and a second mode in which application of an electric field can switch the layer of liquid crystal material from a latched configuration to a switched configuration and in which the layer of liquid crystal material will return to said latched configuration when the applied electric field is removed.

38 Claims, 9 Drawing Sheets

(non defect)

(defect)

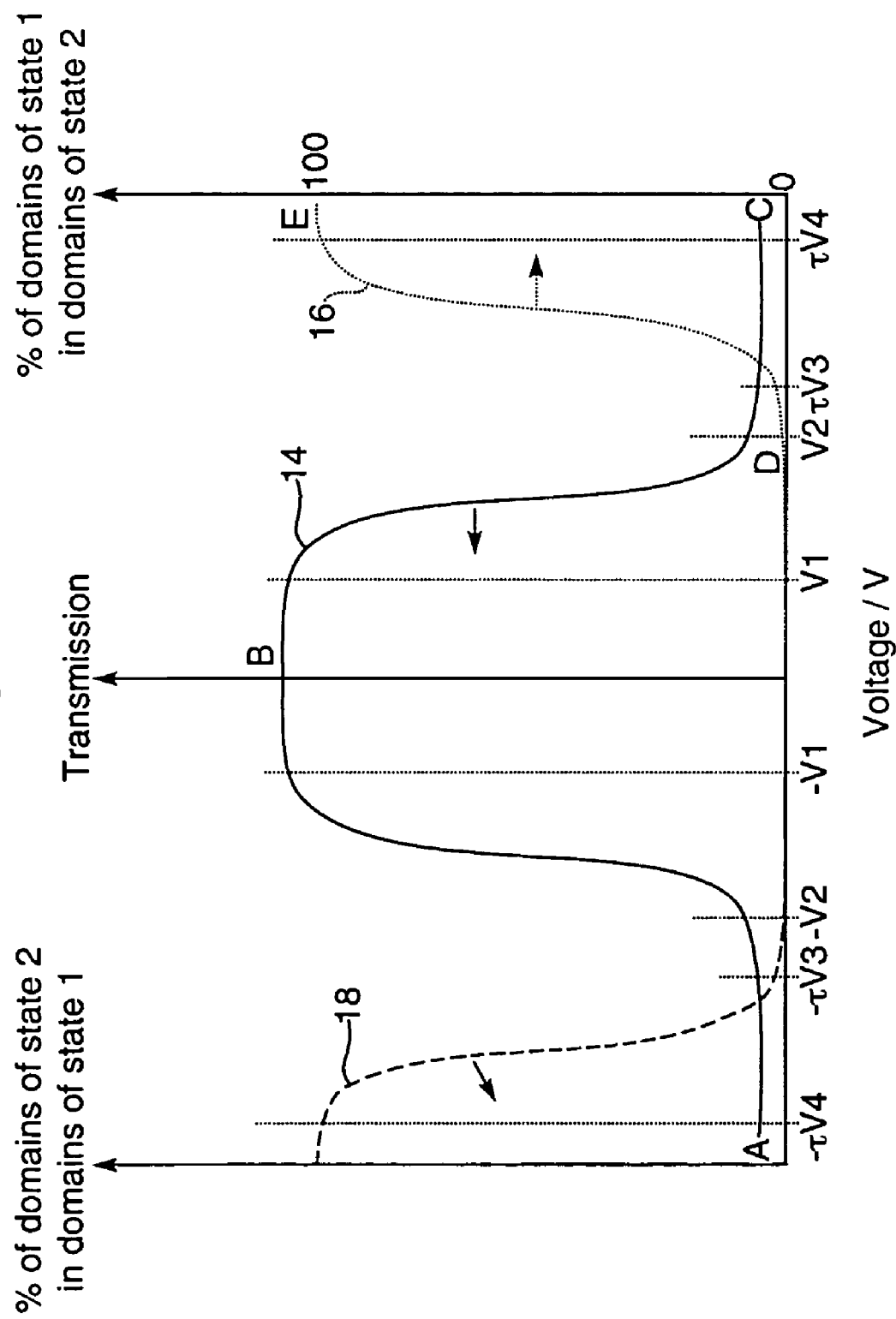

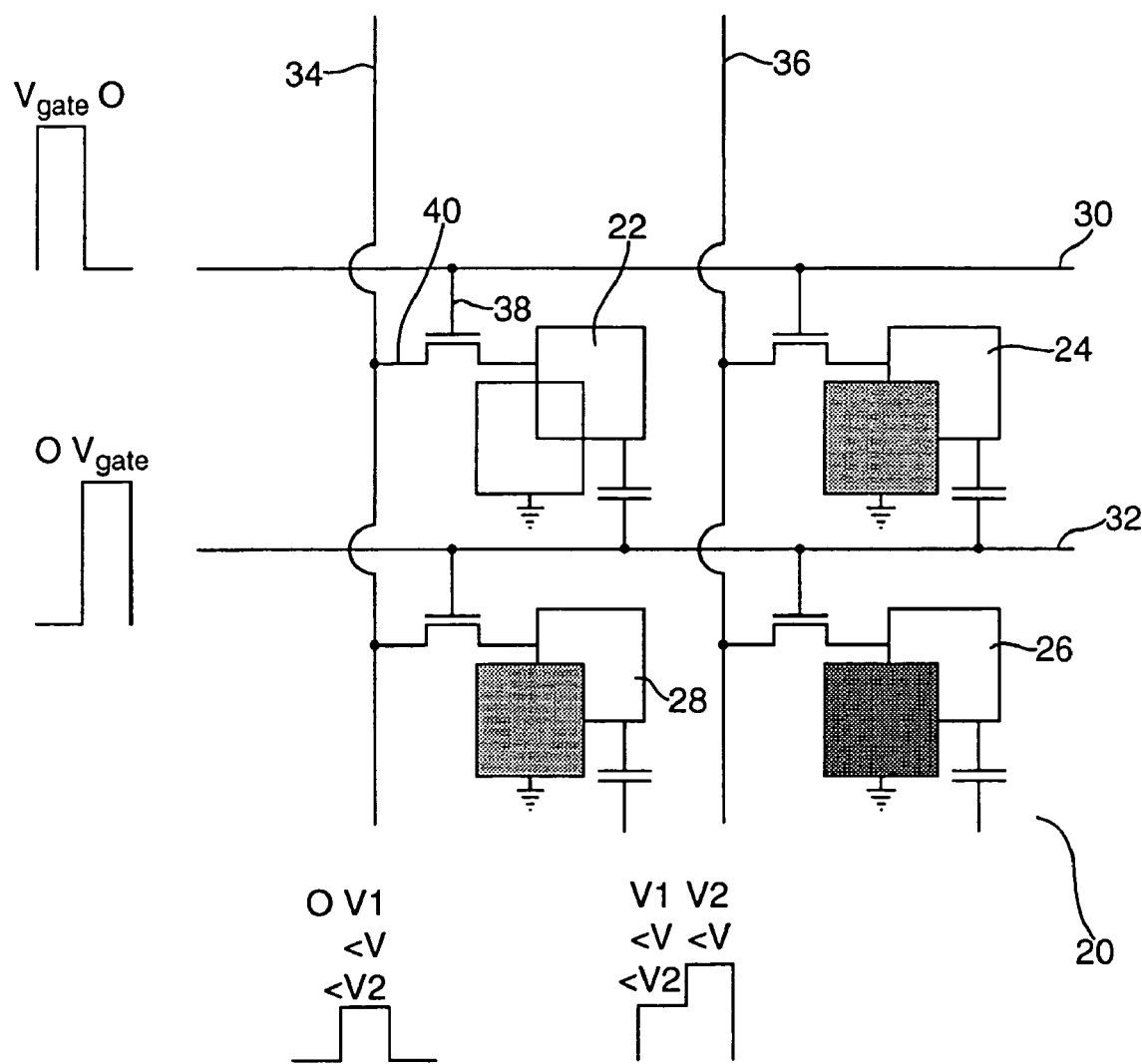

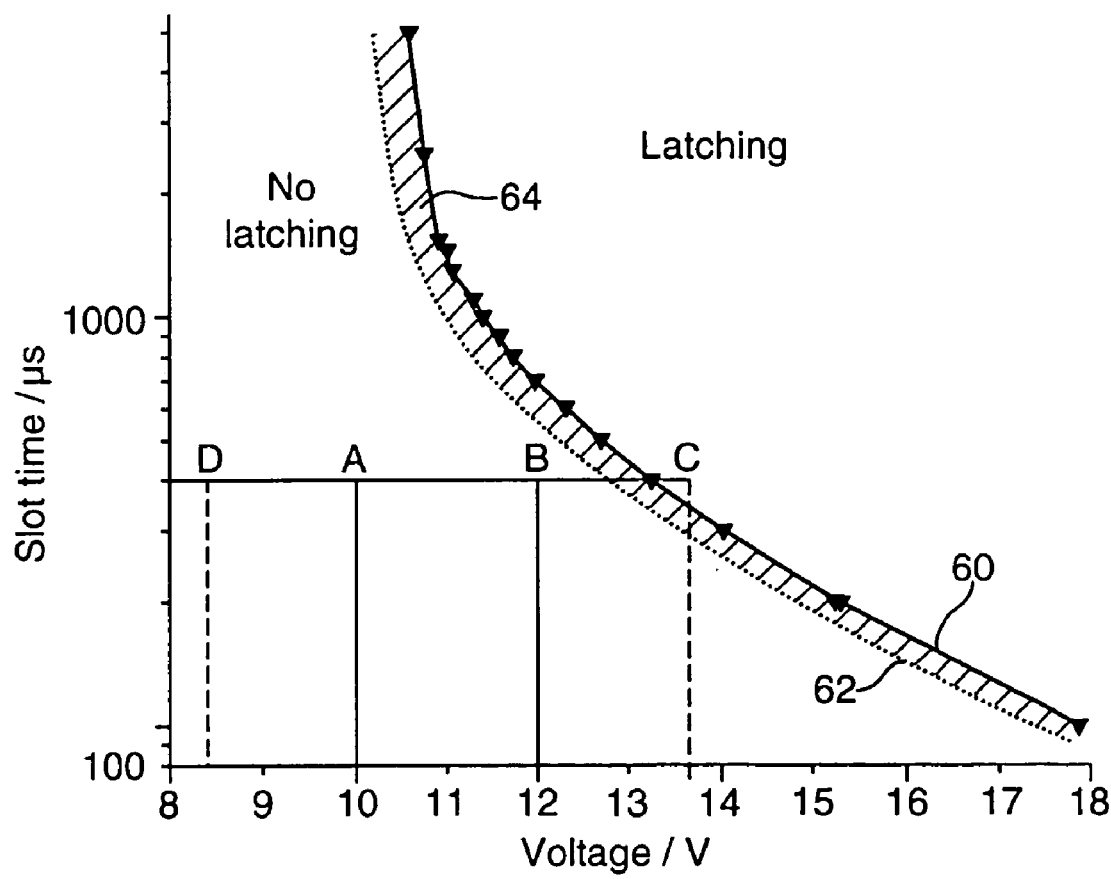

LIQUID CRYSTAL DEVICE OPERABLE IN TWO MODES AND METHOD OF OPERATING THE SAME

This application is the US national phase of international application PCT/SE02/01199, filed in English on 18 Jun. 2002, which designated the US. PCT/SE02/01199 claims priority to SE Application No. 0102151-8 filed 18 Jun. 2001. The entire contents of these applications are incorporated herein by reference.

TECHNICAL FIELD

This invention relates to a liquid crystal device, and in particular to a liquid crystal device which can operate in either of two distinct modes.

BACKGROUND

Liquid crystal devices (LCDs) typically comprise a thin layer of liquid crystal material contained between a pair of cell walls. The internal surface of the cell walls are usually coated with a certain material, or are suitably adapted in some way, to impart a degree of surface alignment to the liquid crystal. The bulk of the liquid crystal then adopts a configuration that depends on the surface alignment properties of the cell walls and on various other factors, such as the type of liquid crystal material and the thickness of the liquid crystal layer. Optically transparent electrode structures on one or both of the cell walls allow an electric field to be applied to the liquid crystal layer.

A typical liquid crystal display device is designed such that two, or more, liquid crystal configurations can be selected by the application of suitable electric fields. The different liquid crystal configurations are designed to be optically distinguishable so that optical contrast can be attained from the liquid crystal device. For example, a liquid crystal device suitably arranged between a pair of polarisers may have one configuration that will allow transmission of light through the system and a second configuration that will prevent it.

Monostable liquid crystal devices, in which the liquid crystal molecules can only adopt one stable configuration, are known. Application of an electric field can distort the configuration of the liquid crystal molecules, but once the electric field is removed the liquid crystal will relax back to its single stable configuration after some characteristic time (typically tens of milliseconds to a few seconds).

Twisted nematic (TN) and super-twisted nematic (STN) LCDs are examples of monostable devices. The TN and STN devices may be switched to an "on" state by application of a suitable voltage, and will switch back to an "off" state when the applied voltage falls below a certain level. It should be noted that the terms "on" and "off" relate to application of high (i.e. switching) voltage and low (i.e. non-switching) voltage respectively not necessarily the observed optical transmission of a display. As these devices are monostable, loss of power leads to loss of the image.

Multi pixel TN and STN passive matrix displays can be constructed using stripes of row and column electrodes on the upper and lower cell surfaces which allows the device to be multiplexed. The drive voltages applied to the row and column electrodes are selected such that a number of separate RMS voltage levels may be applied to each pixel of the display. The optical transmission of a typical TN device varies non-linearly with RMS voltage in a threshold transition manner as detailed by Alt and Pleschko in IEEE Trans ED 21 1974 pages 146–155. The maximum number of pixels that can be addressed using RMS methods is dictated by the optical transmission versus voltage characteristics of the TN or STN device, and in practice it has proven difficult to produce passive matrix STN displays with significantly more than about 500 lines of information due to cross-talk effects and manufacturing tolerances. It has also been demonstrated that other orthogonal functions, such as Walsh functions, can be used to passively address TN and STN displays.

Incorporating a driving element, such as thin film transistor (TFT) or other such non-linear elements (e.g. back-to-back diode, ferroelectric layers etc), adjacent to each pixel in a TN LCD has been found to significantly increase the total number of pixels which can be addressed; such displays are termed active matrix. In addition to the increased number of pixels that can be incorporated in a TN display, active matrix TN devices have many other advantages compared with multiplexed TN or STN displays; such as a relatively low operating voltage requirement, a wide temperature operating range and the capability to provide greyscale. The speed with which TFTs can be switched allows rapid sequential scanning through the row and columns in a display thereby permitting high speed, video rate, operation. As each pixel is isolated using the TFT, the effect of cross-talk is effectively removed in active matrix devices.

Many monostable devices permit grey-scale to be attained by controlling the magnitude of voltage applied to the layer of liquid crystal material. Selecting a TN liquid crystal configuration that has a shallow transmission versus voltage characteristic, and applying a drive voltage to produce an intermediate transmission level, allows greyscale to be attained in active matrix TN devices. A storage capacitor may also be included with the pixel which allows the retention of charge, and hence maintains the electric field across the liquid crystal for a limited period of time. In a TN active matrix device the liquid crystal is monostable, and as the electric field across the pixel decays it will return towards its relaxed configuration. Therefore, maintenance of an image on an active matrix TN display requires the regular updating of each pixel and hence a continual supply of power.

Active matrix TN devices are commonly used today in commercial displays for laptop computers, computer monitors, portable TV etc and devices are known to those skilled in the art which can operate with multiple levels of greyscale at video frame update rates. More detailed reviews of active matrix LCD technology have been prepared; see, for example, R. G. Stewart (1996) Active Matrix LCD, Society for Information Display, Seminar Lecture Notes, Volume 1, 13$^{th}$ May 1996 San Diego Convention Centre, Calif., M5-1-35.

The use of semiconductor circuits transferred to the device substrates using printing techniques or fluidic self-assembly also allow the formation of discrete semiconductor circuits which are capable of addressing two or more display pixels. A review of such devices is given in R. G. Stewart, (2000) Proceedings of the 20$^{th}$ International Displays Research Conference, p415–418, held at Palm Beach Fla. USA, 25–28 Sep. 2000.

U.S. Pat. No. 06,120,588 described how electro-phoretic inks can also be used in conjunction with TFTs. The use of the TFT active matrix removes cross-talk effects from the electro-phoretic ink, which does not have a significant threshold between its states. These devices are also described in K. Amundsen and P Drzaic (2000), Proceedings of the 20$^{th}$ IDRC, 84–87.

Another known type of LCD device is a bistable device. In a bistable LCD, the liquid crystal material can adopt two different, and stable, configurations in the absence of an applied electric field. Research into bistable LCDs has been prompted mainly by their inherent ability to store images and high multiplexibility. This negates the need for devices that have expensive active matrix back-planes and permits line at a time passive addressing.

Application of suitable electric fields to the bistable liquid crystal layer causes switching between the two stable configuration in which it can exist; so called "latching". Hereinafter "latching" shall be taken to mean changing the liquid crystal from one stable configuration to another stable configuration such that the state remains after the applied voltage is removed, whilst "switching" shall mean any field induced change to the configuration of the liquid crystal which includes monostable switching effects.

Bistable liquid crystal devices are almost exclusively addressed using passive matrix techniques; the displays are constructed using stripes of row and column electrodes on the upper and lower cell surfaces which allows the device to be multiplexed. The inherent ability to store images in the absence of power allows potentially complex images to be built up a line at a time and also makes bistable devices attractive in applications where low power consumption is required, for example in laptop computers, PDAs and mobile telephone devices.

Examples of bistable liquid crystal displays include surface stabilised ferroelectric liquid crystal (SSFLC) devices as described by N A Clark and S T Lagerwall, Appl. Phys. Lett., 36, 11, 899 (1980). Ferroelectric liquid crystal device are generally passively addressed but, because of the extremely rapid speed in which FLC materials can latch between the two stable configurations, they have also been combined with active matrix backplanes to produce devices having very fast frame times; see, for example, see J. Xue and M. A. Handschy, (2000) Proceedings of the $20^{th}$ IDRC, p13–17.

It has also been demonstrated previously (see U.S. Pat. No. 5,604,616) that it is possible to operate a cholesteric display in a pseudo bistable manner. The display can be electronically latched from a first stable state to a second stable state by application of a high voltage. Once the device is latched into the second state it is effectively "frozen" in that state and it is only possible to reliably reselect the first stable state by heating the device above the isotropic temperature of the liquid crystal material. The first and second stable states are twisted nematic configurations that possess a different degree of overall twist. Operating the device in what is termed the nematic mode permits RMS switching of device from either of the stable states. The device of U.S. Pat. No. 5,604,616 thus provides none of the benefits of truly bistable operation. For example, such a device does not allow images that persist in the absence of applied electrical power to be written and subsequently rewritten many time using only electrical addressing techniques.

It has also been shown in Patent Applications WO 91/11747 ("Bistable electrochirally controlled liquid crystal optical device") and WO 92/00546 ("Nematic liquid crystal display with surface bistability controlled by a flexoelectric effect") that a nematic liquid crystal can adopt, and can be switched between, two stable states via the use of chiral ions or flexoelectric coupling.

WO 97/14990 teaches how a zenithally bistable device (ZBD) may be constructed using a grating of a given design such that nematic liquid crystal molecules can adopt two stable pretilt angles in the same azimuthal plane. One of these states is a high pretilt state, whilst the other is a low pretilt state and a device is described which can adopt, and can be readily switched between, either of the two stable liquid crystal configurations. WO99/34251 teaches another ZBD device having a negative dielectric anisotropy material in a twisted nematic configuration. Patent application GB0017953.1 describes a zenithally stable device exhibiting multi-stability rather than bistability.

The two stable liquid crystal configurations of ZBD persist after driving electrical signals have been removed, and (see Wood et. al. SID Digest 2000) the device is highly resistant to mechanical shock, provides 10s of microsecond latching times at low driving voltages (<20V) and allows a high degree of multiplexibility. It has also been shown, see Bryan-Brown et al, (1998) proceedings of Asia Display, p1051–1052, that grey-scale may be achieved using a chirped grating that allows partial switching of a pixel.

Although bistable devices are ideal for low power and low cost application, there is also a requirement in certain applications (such as when displaying video images) to have a number of levels of grey in-between the dark and light states. Greyscale can be achieved in truly bistable devices using temporal and/or spatial dither where the perception of grey-levels is provided by switching each pixel "on" and "off" at a rate faster than the viewer can perceive or by dividing each pixel into two or more weighted sub-pixel regions.

Employing spatial and/or temporal dither techniques in bistable display devices does however increase the complexity, and hence unit cost, of devices. For example spatial dither increases the number of row and column drivers, requires thinner tracks thereby increasing track resistance and resistive powers losses in the panel and also requires more accurate etching to ensure linearity of the greyscale response. It is for these reasons, that passively addressed bistable devices known to those skilled in the art are, for the present at least, somewhat limited in there ability to produce high numbers of grey-levels and moving video images.

It is an object of this invention to mitigate some of the disadvantages associated with the liquid crystal devices described above.

SUMMARY

According to a first aspect of the invention, a liquid crystal device comprises a layer of liquid crystal material disposed between two cell walls in an arrangement such that the liquid crystal material can adopt any one of two or more stable liquid crystal configurations that will persist in the absence of an applied electric field, the liquid crystal device being operable in two modes; a first mode in which application of an appropriate latching voltage pulse can select any one of the two or more stable liquid crystal configurations, and a second mode in which application of an electric field can switch the layer of liquid crystal material from a latched configuration to a switched configuration and in which the layer of liquid crystal material will return to said latched configuration when the applied electric field is removed.

A device according to the first aspect of this invention will thus, when operating in the first (multi-stable) mode, have the advantage of being able to store images without the need for continual electrical addressing of the device. Once an image is stored, it may be removed (or an alternative image written) by latching the device into the required state. As described above, the ability to write (and re-write as required) an image to a device and for that image to then persist in the absence of power can reduce the overall power consumption of the device. This is particularly advantageous when the device is incorporated in portable equipment, such as laptop computers, PDAs, digital cameras, electronic picture frames, mobile telephones etc.

A device according to this invention can also, when operating in the second mode, be switched from any one of the stable (i.e. latched) liquid crystal configurations into a "switched configuration". A switched liquid crystal configuration will remain whilst power is applied to the device, but the liquid crystal will decay back to the stable liquid crystal configuration when the applied field is removed. Second mode operation may provide a greater number of grey-levels or a faster switching rate than attainable from operation in the first (i.e. multistable) mode. In other words, switching between transient liquid crystal states can be used to display images but such images require periodic updating.

A device according to this invention thus provides some of the benefits normally associated with only multi-stable or monostable devices. For example, low power operation can be achieved by operation in the first mode whilst faster image updating and/or an increased number of grey-levels etc can be obtained by operation in the second mode.

Advantageously, the liquid crystal display device is latched in to a particular stable configuration prior to operation in the second mode. Generally, the state that is selected is the state which is the most dissimilar to that induced by the field in the second mode.

Preferably, the arrangement is such that the liquid crystal material can adopt any one of three or more stable liquid crystal configurations. Latching voltage pulses can then be provided to switch between any of the three or more stable configurations.

Conveniently, the arrangement is such that the liquid crystal material can adopt any one of two stable liquid crystal configurations. In other words, the device is bistable and either of the two stable liquid crystal configurations can be selected by application of suitable latching voltage pulses.

Advantageously, a surface alignment grating is provided on the internal surface of at least one cell wall that is adapted to provide two stable liquid crystal configurations. Surface alignment gratings that provide zenithal bistability are described in the prior art; see for example WO 97/14990.

Conveniently, the liquid crystal material comprises a nematic liquid crystal material.

Preferably, the liquid crystal device may comprise a surface alignment grating provided on the internal surface of the first cell wall and a planar surface treatment provided on the internal surface of the second cell wall, the arrangement being such that one of the stable liquid crystal configurations is a twisted nematic (TN) configuration.

In other words, one of the two stable alignment configurations induced by the surface alignment grating provides substantially planar alignment of the liquid crystal at one cell wall, and a homogenous surface treatment on the other cell wall induces substantially planar alignment of the liquid crystal at that wall. The in-plane alignment direction of the substantially planar alignment induced by the surface alignment grating at one cell wall is adapted to be substantially different to the in-plane alignment direction induced by the homogenous surface treatment at the other cell wall such that one of the stable liquid crystal configurations adopted is a twisted nematic configuration.

Herein the term twisted nematic (or TN) configuration means a configuration in which the liquid crystal twists from a orientation at one cell wall to a second orientation at the other cell wall. The term includes so-called super twist (STN) structures and the like.

Conveniently, the twist of the liquid crystal material from the first cell wall to the second cell wall in the twisted nematic configuration is greater than 45° or greater than 90° or greater than 180° or greater than 270°.

Advantageously, the device is latched into the twisted nematic configuration prior to operation in the second mode.

In this way, a zenithally bistable device is provided with one stable liquid crystal configuration being a twisted nematic (TN) configuration. This TN configuration will switch in response to the RMS voltage in a similar manner to the monostable TN structures described in the prior art. In other words, a device is provided which can be latched into either of two bistable states by an electrical pulse and which can also switch in response to applied voltages in the same way as as a monostable TN device. Advantages of TN devices are thus combined with advantages of electrically latched bistable operation.

Advantageously, the liquid crystal device comprises a surface alignment grating provided on the internal surface of the first cell wall and a homeotropic surface treatment provided on the internal surface of the second cell wall, the arrangement being such that one of the stable liquid crystal configurations is a vertically aligned nematic configuration.

In other words, the surface alignment grating on the internal surface of one cell wall is adapted such that it induces substantially homeotropic alignment, and a surface treatment on the other cell wall induces substantially homeotropic alignment of the liquid crystal, such that one of the stable liquid crystal configurations adopted is a vertically aligned nematic (VAN) configuration.

A person skilled in the art would appreciate that the term vertically aligned nematic structure means any liquid crystal configuration in which the liquid crystal director throughout the device is oriented in a substantially perpendicular direction to the cell walls of the device. In other words, the nematic liquid crystal is vertically aligned with reference to the horizontal cell walls.

Conveniently, the device is latched into the vertically aligned nematic configuration prior to operation in the second mode.

Preferably, the liquid crystal material comprises a nematic (or long pitch cholesteric) material. Conveniently, the liquid crystal material may further comprise cholesteric liquid crystal material. Advantageously, the liquid crystal material comprises less than 0.02% by weight of cholesteric liquid crystal material.

Advantageously, the ratio of liquid crystal layer thickness to the pitch of liquid crystal material is greater than 0.25 and/or less than 1.25.

Inclusion of a cholesteric dopant will enable a twisted nematic structure having a twist of greater than 90° to be readily achieved. A TN structure having a twist greater than 90° will give an STN like steep electro-optic switching threshold. This steep threshold reduces cross-talk effects and enables a larger number of lines to be passively addressed in the continuous mode.

Preferably, the liquid crystal material has a negative dielectric anisotropy or alternatively a positive dielectric anisotropy.

Preferably, the cell walls comprise electrodes for applying an electric field to the liquid crystal, the electrodes being arranged to form a matrix of addressable pixels.

Conveniently, the device comprises row electrodes formed on the first cell wall and column electrodes formed on the second cell wall, the first and second cell walls being arranged so as to define an array of passively addressable pixels. The display may then be multiplexed by application of appropriate row and column voltage waveforms.

Advantageously, the device comprises a means of independently applying an electric field to each individual pixel. In other words, an active backplane may be provided.

Conveniently, the means of independently applying an electric field to each individual pixel comprises a thin film transistor element, which may advantageously have a storage capacitor associated therewith. The storage capacitor allows charge to be stored so that an electric field is held across the liquid crystal for a period of time; for the reasons described above in relation to active matrix monostable devices such charge storage is advantageous for device operability in the second mode.

In a further preferred embodiment, the device includes at least one discrete semiconductor circuit capable of addressing two or more display pixels. Such semiconductor circuits are described in R. G. Stewart, (2000) Proceedings of the 20$^{th}$ International Displays Research Conference, p415–418, held at Palm Beach Fla. USA, 25–28 Sep. 2000.

Preferably, the device is adapted such that the first mode of operation and the second mode of operation are capable of simultaneous use on different pixels or groups of pixels.

Advantageously, pixels that are to be operated in the second mode may be latched into a predetermined stable liquid crystal configuration (i.e. blanked) prior to operation in the second mode.

A given portion of a display device may thus be operated in the first mode whilst a another portion is operated in the second mode. In the case of a display, this allows certain areas of the device to take advantage of the higher switching speed or increased number of grey-levels of second mode operation whilst conserving power to some extent by operating the remainder of the display in the first mode. For example, a laptop computer display may be required to show a moving or high resolution image only in a defined area, or window, of the display.

Conveniently, the driving voltages applied to the device are substantially d.c. balanced over time. This prevents degradation of the liquid crystal material.

Preferably, the second mode is adapted to display images at video rate (i.e. 50 or more frames per second) and/or with at least 64 or 256 grey-levels. The second mode may also be operated at a lower rate (e.g. 10 frames a second) to enable black and white animation to be displayed.

In a further preferred embodiment, the device comprises at least one polariser to distinguish between different liquid crystal configurations. A person skilled in the art would recognise the various way or ways in which one or two polarisers could be arranged, possibly in conjunction with additional optical elements (e.g. retardation films etc) such that optical contrast could be obtained for the various liquid crystal configurations. It would also be recognised that a dye may also be included in the liquid crystal material in addition to, or instead of, providing a polariser.

Advantageously, the device further comprises a reflective means and the device is configured to operate in reflective mode. The reflective means may comprise a specularly reflective layer, or a reflective layer on one cell wall combined with a diffuser on the other cell wall.

The liquid crystal display device may additionally comprise colour filter elements. Alternatively, colour reflectors or coloured absorbers or coloured polarised could be employed as required. A colour display device may thus be obtained.

Preferably, the device further comprises means for selecting first mode or second mode operation.

For example, means may be provided that differentiates between information relating to static pictures and video signals. For example areas of text on a page of a computer screen may be addressed in storage mode, whilst moving images are addressed in continuous mode. Alternatively, the means may select the mode of operation by taking into account the format of data to be displayed. For example, when the device displays a clock it may always display seconds in the continuous mode, but the minutes and hours and other information (e.g. date, icon etc) in the storage mode.

It is also possible to operate the device such that one line of information (e.g. the line of text currently being edited) is updated in the second mode whilst the remainder of the display (i.e. text that is not in the process of being edited) is displayed using the first mode. A person skilled in the art would recognise how signals to select first mode or second mode operation as appropriate could be derived from the graphics hardware and/or software that is used to construct the image data for display. This technique is particularly advantageous for devices in which the contrast decreases substantially during first mode (i.e. latching) operation.

According to a second aspect of the invention, an information display apparatus comprises a microprocessor unit adapted to electronically address a liquid crystal device according to the first aspect of the invention. The information display apparatus may be a laptop computer, PDA, digital camera, electronic picture frame, mobile telephone etc.

According to a third aspect of the invention, a method of operating a liquid crystal device comprising the steps of; taking a liquid crystal device that is arranged such that the liquid crystal material can adopt any one of two or more stable liquid crystal configurations that will persist in the absence of an applied electric field, and determining whether to operate the device in a first mode or a second mode, whereby in the first mode of operation any one of the two or more stable liquid crystal configurations can be selected by application of an appropriate latching voltage, and in the second mode of operation the application of an electric field can switch the layer of liquid crystal material from a latched configuration to a switched configuration and in which the layer of liquid crystal material will return to said latched configuration when the applied electric field is removed.

Conveniently, the liquid crystal device comprises a plurality of pixels and in which only some of the pixels are operated in the second mode.

Advantageously, the liquid crystal material is latched in to a particular stable configuration prior to operation in the second mode.

Preferably, the method is performed on a suitable configured zenithal bistable device.

The present invention thus provides a liquid crystal display device which is operable in two modes, wherein the first mode is a muti-stable mode such that images persist in the absence of an electric field, and the second mode offers a greater number of grey levels and/or faster switching speeds and/or addressing without unwanted contrast variations and/or the ability to display animated images than the first mode when appropriate electric fields are applied to the device.

In other words, a liquid crystal device (LCD) comprises; a layer of liquid crystal material contained between two cell walls and a means of applying an electric field thereto, means of optically distinguishing different configurations of the liquid crystal layer wherein the LCD is adapted such that under the influence of an electric field the optical transmission properties of the device are altered in a controlled manner, and where differing electric fields produce a plurality of transmission levels, and where the layer of liquid crystal material is also bistable such that under no applied field the liquid crystal material adopts either of two configurations and where the application of a voltage pulse of suitable polarity, magnitude and direction causes the liquid crystal material to latch into either one of its two bistable states.

Furthermore, this invention also provides a method of operating a liquid crystal device in two modes, said method comprising the step of operating the device in a latching mode such that two or more stable liquid crystal configurations may be selected, said stable liquid crystal configurations persisting in the absence of an applied voltage; said method additionally or alternatively comprising the step of operating the device in a second mode such that the application of an electric field provides a plurality of transient liquid crystal configurations, whereby the step of operating the LCD in latching mode is performed to switch the LCD into a stable configuration such that the selected stable configuration will persist without the requirement to continually expend power.

BRIEF DESCRIPTION OF THE DRAWINGS

The invention will now be described by reference to the accompanying drawings, in which;

FIG. 4 is a schematic illustration of a prior art TN active matrix device, FIG. 6 illustrates a passive addressing regime.

DETAILED DESCRIPTION

Referring to FIG. 1, a zenithal bistable device of the type described WO99/34251 is shown. A layer of nematic liquid crystal material 2 having a negative dielectric anisotropy is sandwiched between a first glass wall 4 and a second glass wall 6. The first glass wall 4 is coated with a bistable surface alignment grating 8 which is coated with a homeotropic surfactant; as described in WO97/14990 and WO99/34251 the liquid crystal in the vicinity of the granting surface may then adopt either a non-defect or defect alignment configuration. The second glass cell wall 6 is treated, for example by coating with a polymer that is subsequently rubbed, to induce planer surface alignment of the nematic liquid crystal material 2 at the second glass wall 6.

Figure 1A:
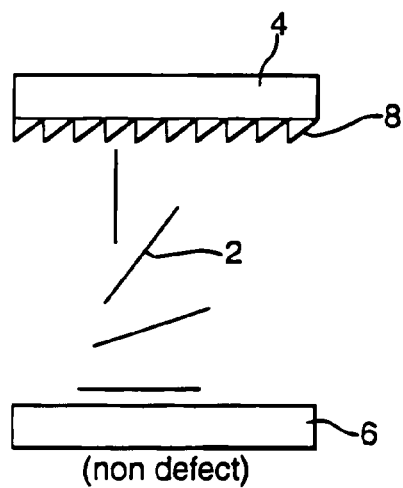
FIG. 1 shows a schematic illustration of a prior art ZBD.
Figure 1B:
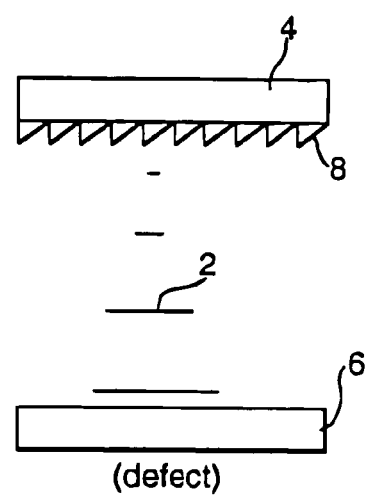

The non-defect and defect structures that are induced by the surface alignment grating are shown in FIGS. 1a and 1b respectively.

In the non-defect structure of FIG. 1a the nematic liquid crystal will, at the interface between the surface alignment grating 8 and the liquid crystal 2, orient so as to be substantially perpendicular to the local surface of the grating. Within a short distance of the grating-liquid crystal interface, as compared with the overall thickness of the liquid crystal cell, the liquid crystal will adopt a substantially homeotropic alignment configuration. Homogenous alignment of the liquid crystal is induced at the second glass wall 6, and a splayed liquid crystal configuration is thus adopted.

In the defect structure of FIG. 1b, so-called defects or disclinations will form in the vicinity of concave and convex defect sites. The result of the formation of defect pairs is that within a short distance of the grating-liquid crystal interface, as compared with the overall thickness of the liquid crystal cell, the nematic liquid crystal will adopt a configuration with a pretilt substantially less the homeotropic configuration. In this configuration, a 60° twisted structure is formed, which has low (typically of the order of 20°) out of plane tilt.

WO99/34251 describes how such a structure, when formed from a nematic material having a negative dielectric anisotropy, reduces unwanted RMS voltage effects and enhances bistable performance.

Figure 2:
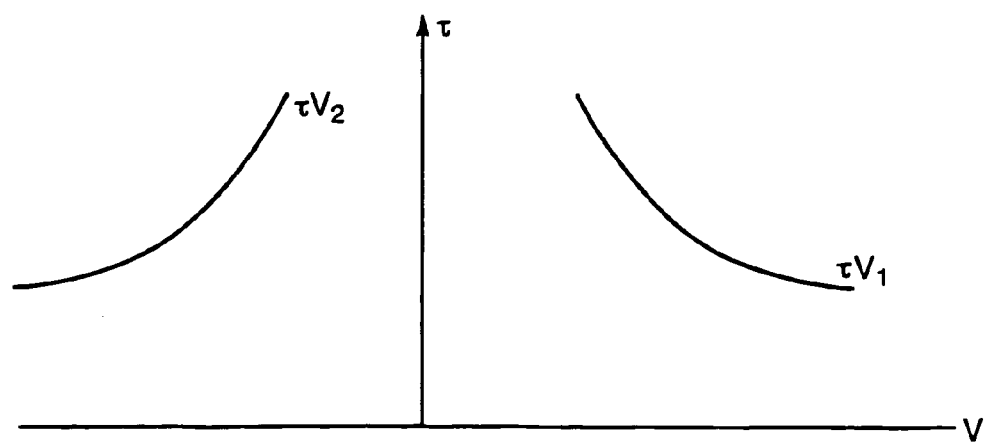
FIG. 2 shows the switching characteristics of a prior art ZBD.

Referring to FIG. 2, the switching characteristics of a device as shown in FIG. 1 are presented in the form of a graph depicting the voltage and width of switching pulse necessary to switch the device between the defect and non-defect states. This is described in more detail elsewhere (see e.g. WO97/14990, WO99/34251).

Placing a device of the type shown in FIG. 1 between a pair of crossed polarisers, for example, allows optical contrast to be achieved between the splayed non-defect state of FIG. 1a and the twisted defect state of FIG. 1b. It would be immediately apparent to a person skilled in the art how to optimise the cell thickness, for a liquid crystal material of a given birefringence, to maximise the contract obtained. A person skilled in the art would also recognise that a plurality of alternative optical systems could be used to exploit the difference in optical properties of the defect and non-defect states.

As described above, it is difficult to achieve the 256 grey-levels needed for full colour images with bistable devices and one means of achieving this is to use spatial dither. For example, digital weighting of the rows in the ratio 1:2 and columns in the ratio 1:4 allows 8 levels to be achieved, even though each pixel has only 2 inherent levels. If an intermediate (or analogue) level is possible then weighting the rows and columns in ratios of 1:3 and 1:9 respectively allows a maximum of 81 grey levels to be achieved. This is still insufficient for full colour applications. It becomes possible to display 256 static grey levels if a $4^{th}$ level is possible by weighting the rows in the ratio 1:4 and the columns in the ratio 1:16.

However, there are a number of problems with using spatial dither in this fashion. It doubles the number of row drivers and the number of column drivers, representing a major cost to the overall module cost. Losses along the thin tracks also become substantial. For example, with a 250 μm pixel pitch and a 10 μm minimum etch, the 4 level ZBD requires a minimum sub-pixel width of 13.5 μm. Although possible to manufacture, the track resistance for a large panel can be very high indeed and there are significant losses of the signal down the line. Also, etching errors (particularly on the least significant bit) can lead to non-linear or loss of grey levels.

Another important requirement for display devices is the need for video operation, usually with a frame rate of about 50 Hz. Video operation is easy with TFT driven LCD due to the high speed of the transistor switch, provided that the liquid crystal material and cell gap are chosen to give suitably fast optical response. With a bistable display device, such as ZBD, the frame rate is dictated by two factors: the line-address-time multiplied by the number of lines, and the slower of the optical response times. For very complex displays with a large number of lines, it is therefore difficult to achieve video rate (i.e. 50 Hz) operation. This situation is worse using spatial dither, since there may be at least twice as many addressable rows in the display.

The present invention provides a device that, in common with prior art ZBD devices, can latch into either one of the two stable ZBD states; it can operate in bistable, or image storage, mode. In addition, a device of the present invention is also designed to exhibit a RMS voltage response at sub-latching voltages; i.e. it also operates in a sub-latching, or continuous, mode. In other words, the device can be operated both as a bistable device and in a RMS mode. This dual mode of device operation runs contrary to the present thinking in the art that the mode of operation, and hence electrical addressing, of monostable and bistable devices are quite distinct.

Referring to FIG. 3a, the voltage versus transmission response characteristic of a device according to the present invention is shown. Curve 14 represents the RMS response of the liquid crystal in the bulk of the cell, and is analogous to a standard TN response. Curve 16 represents the change in transmission as the device latches from the defect to the non-defect state, and curve 18 represents the change in transmission as the device latches from the non-defect to the defect state. As described in more detail below, devices according to the present invention are designed such that bistable switching (i.e. latching) and RMS switching (i.e. sub-latching voltage induced distortion of the liquid crystal) are separated so that both can be exploited discriminately in a single device.

The type of behaviour shown in FIG. 3a is achieved using a twisted nematic ZBD geometry of the type described with reference to FIG. 1 above. However, unlike the ZBD device described with reference to FIG. 1 the dielectric anisotropy of the liquid crystal material in this device is preferably (although not necessarily) positive. The mono-stable surface has low pre-tilt, planar homogeneous alignment arranged perpendicular to the director in the defect state of the zenithal bistable surface. The device in this instance acts in normally white mode when it is placed between crossed polarisers. Once blanked into the defect (low tilt) state, the whole pixel appears transmissive due to the twisted nematic structure in the bulk of the liquid crystal.

Application of a voltage higher than the TN transition voltage V1 (either positive or negative since it is an RMS response) causes the director to reorient in the bulk of the cell with negligible change at either surface. A typical TN transmission characteristic saturates into the dark state around ±V2. Typical values for V1 and V2 are 1.5V and 4.5V, respectively.

Although the monopolar pulse applied to the liquid crystal in RMS mode is of the correct sign to cause latching into the non-defect state, the device is designed such that V2 is not sufficient to cause any latching of the surface; i.e. to produce latching from the defect to non-defect configuration requires a voltage pulse greater than $\tau V3$ to be applied. It should be noted that latching occurs when a pulse of sufficient voltage and duration is applied to the device (i.e. in this case a pulse greater than $\tau V3$), whereas the RMS response depends purely on the RMS voltage level and is independent of the polarity.

To ensure (approximate) d.c. balancing the device may, for example, be latched using an appropriate negative pulse at the start of each frame. This also ensures that the correct stable state is rewritten at the start of each frame to help reduce errors.

Figure 3B:
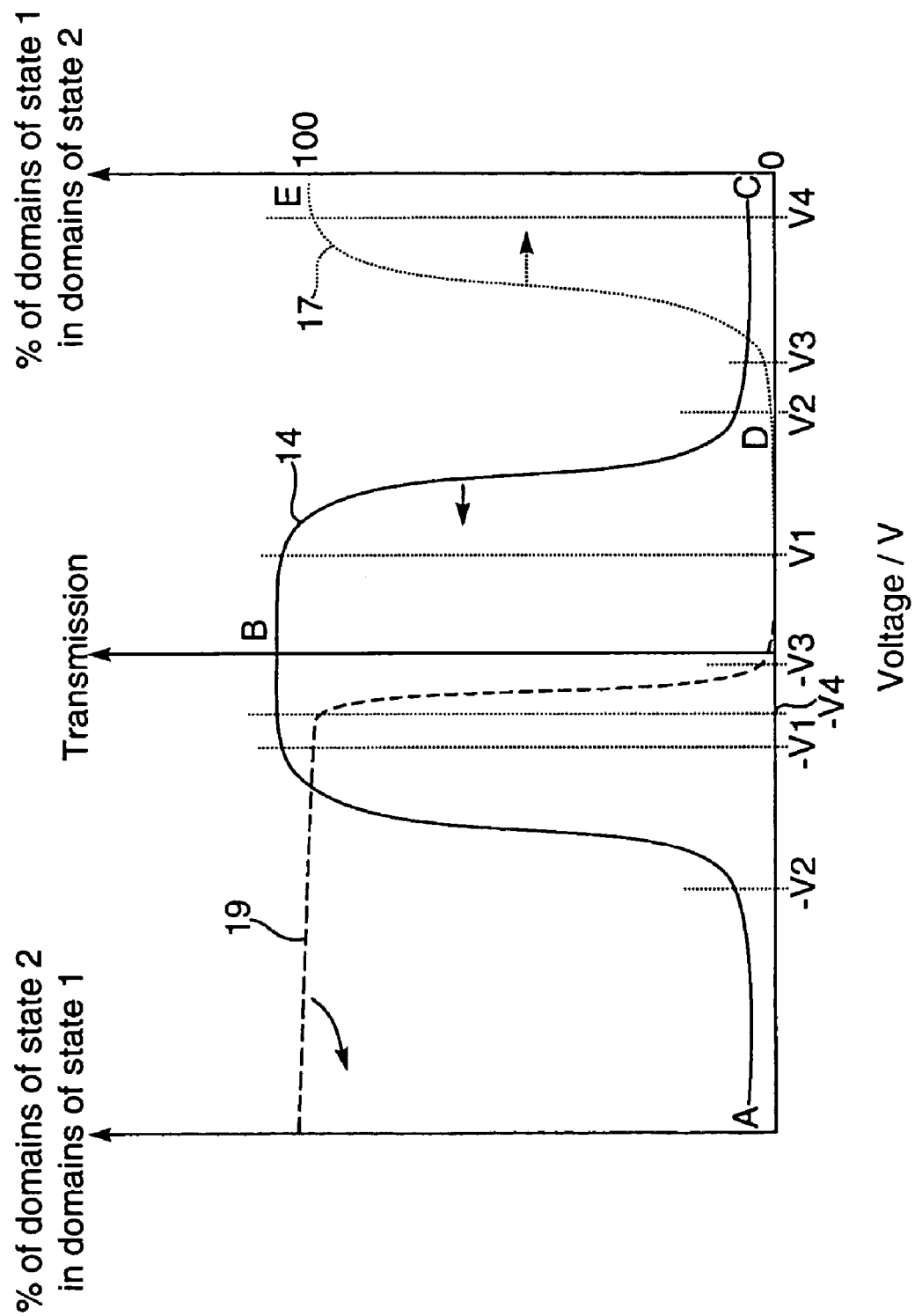
FIG. 3 is the transmission vs voltage response of a device according to this invention.

Referring to FIG. 3b, a voltage versus transmission response is given for a device in which the bistable grating is designed to provide an asymmetric latching response; teaching on how to obtain such a grating design is found in the prior art, for example see WO97/14990. Curve 14 represents the RMS response of the liquid crystal in the bulk of the cell, and is analogous to a standard TN response. Curve 17 represents the change in transmission as the device latches from the defect to the non-defect state, and curve 19 represents the change in transmission as the device latches from the non-defect to the defect state.

In this device, latching from the non-defect state to the defect state (i.e. applying a pulse of voltage of less than $-\tau V3$) can be obtained with a similar magnitude of voltage pulse that is required to exploit the RMS response. In this manner, the device can be addressed whilst maintaining substantial d.c. balance.

A device of the present invention can thus operate in either of two modes: continual update mode or image storage mode. The present invention can thus provide a display that is capable of full colour, video operation and which has the ultra-low power consumption of a device that has true image storage. A person skilled in the art would also immediately recognise that the use of a device of the present invention could prove advantageous in any application where the modulation of radiation is required; e.g. as a spatial light modulator, optical shutter etc.

The display is designed such that these modes have separate voltage/charge operating ranges. This is done through choice of LC material (e.g. elastic properties, dielectric anisotropy), grating design (e.g. grating pitch, depth, shape), surface anchoring properties and cell gap so that latching into both bistable states occurs for voltages greater than the saturation voltage for changes in transmission. The control of the relative voltages require for continual update or storage mode is possible because latching of the ZBD display is a field effect (being associated with the flexo-electric polarization) whereas the dynamic RMS response of the transmission is a voltage effect, and thus independent of cell gap.

Once the display is switched into storage mode, the last frame of information is read from the frame store, but encoded into a suitable level of complexity (eg B/W or a limited number of grey-levels) the display is again blanked and selectively written with voltages which exceed $+\tau V4$ for pixels to be latched into the other stable state. This image will then be retained until the next update of the frame, even though the device may be disconnected from the power. This may be done automatically on power off to a display.

To implement this invention a TFT active matrix can be used and FIG. 4 shows a typical prior art TFT TN device 20. Four TFT driven pixels are illustrated 22, 24, 26, 28 together with row electrodes 30, 32 and column electrodes 34, 36. The device shown operates in normally white mode (i.e. the pixel remains white where the column voltage is zero). Grey levels may be achieved by amplitude modulation of the signals applied to the column electrodes.

The transistor that is associated with each pixel in an active matrix display generally has two electrical input connections; a gate connection 38 and a drive connection 40. Application of a suitable voltage to the gate connection 38 applies the voltage present on the drive connection 40 to the transparent pixel electrode 22. It is also possible to form a grating alignment structure (i.e. a structure that can impart a degree of alignment to a liquid crystal material) in one or more of the layers used to form the TFT.

Active matrix displays are typically arranged with the gate connections of each pixel transistor in a row connected to a common row electrode, and the drive connections of each transistor in a column connected to a common column electrode. Application of a gate voltage to a single row in combination with the application of a driving voltage to a single column thus allows a driving voltage to be applied across the liquid crystal layer of an individual pixel. Suitable drive and gate voltage pulses to address the 4 pixel device of FIG. 4 are also shown.

Referring to FIG. 5, TFT addressing schemes suitable for driving a device according to the present invention are given.

Figure 5A:
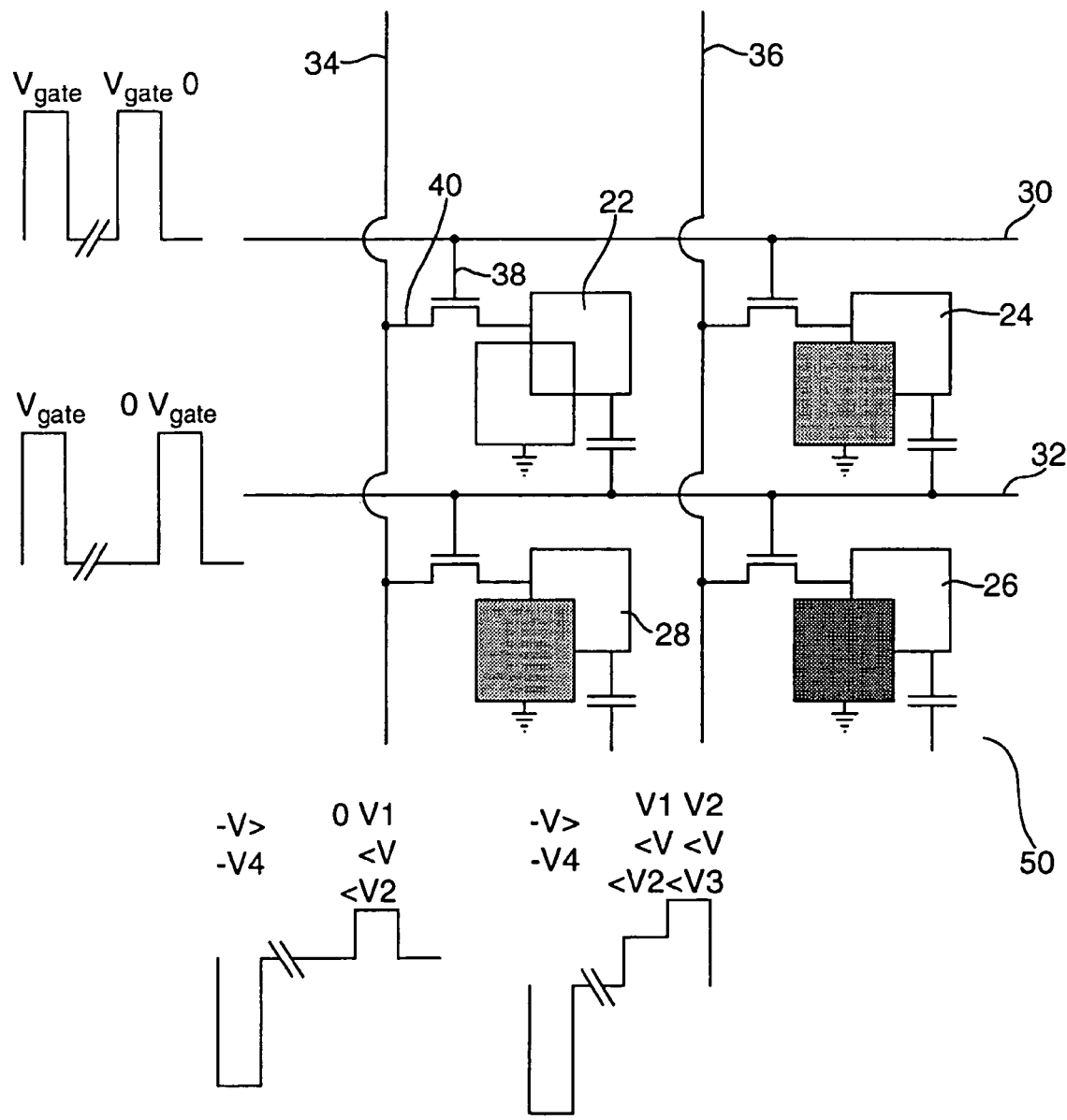
FIG. 5 shows an active matrix device according to the present invention.

FIG. 5a) shows the active matrix addressing schemes required for operation of a dual mode device 50 according to this invention in continual update mode. During any period in which a voltage pulse is applied to the gate connection 38, the voltage applied to the drive connection 40 is applied to the electrode of the pixel 22.

Using the driving scheme shown in FIG. 5a, it can be seen that the pixel 22 is initially latched into one bistable state (i.e. blanked) before a voltage is applied which switches the liquid crystal in to the desired configuration. Ideally the pixel is blanked into the stable state which will provide the best change in optical contrast on subsequent application of a RMS voltage. In this mode the device operates in a manner analogous to a TN device; any voltage (below the latching voltage $\tau V3$) will cause a distortion of the liquid crystal configuration. As this voltage decays, the liquid crystal will relax toward the initial (i.e. blanked) stable configuration.

The pixels of a device according to this invention can be written each row sequentially as in the prior art, ensuring that the column voltage never supercedes $\tau V3$ and thereby no latching into the other domain occurs. Note, unlike conventional TFT drive schemes, the polarity of the column voltages is kept the same in all frames (rather than alternating polarity from frame to frame to give overall DC balancing). A person skilled in the art would recognise the various mechanisms through which d.c. balance could be obtained over time; for example a variable voltage blanking pulse or the use of a d.c. balancing pre-pulse.

Figure 5B:
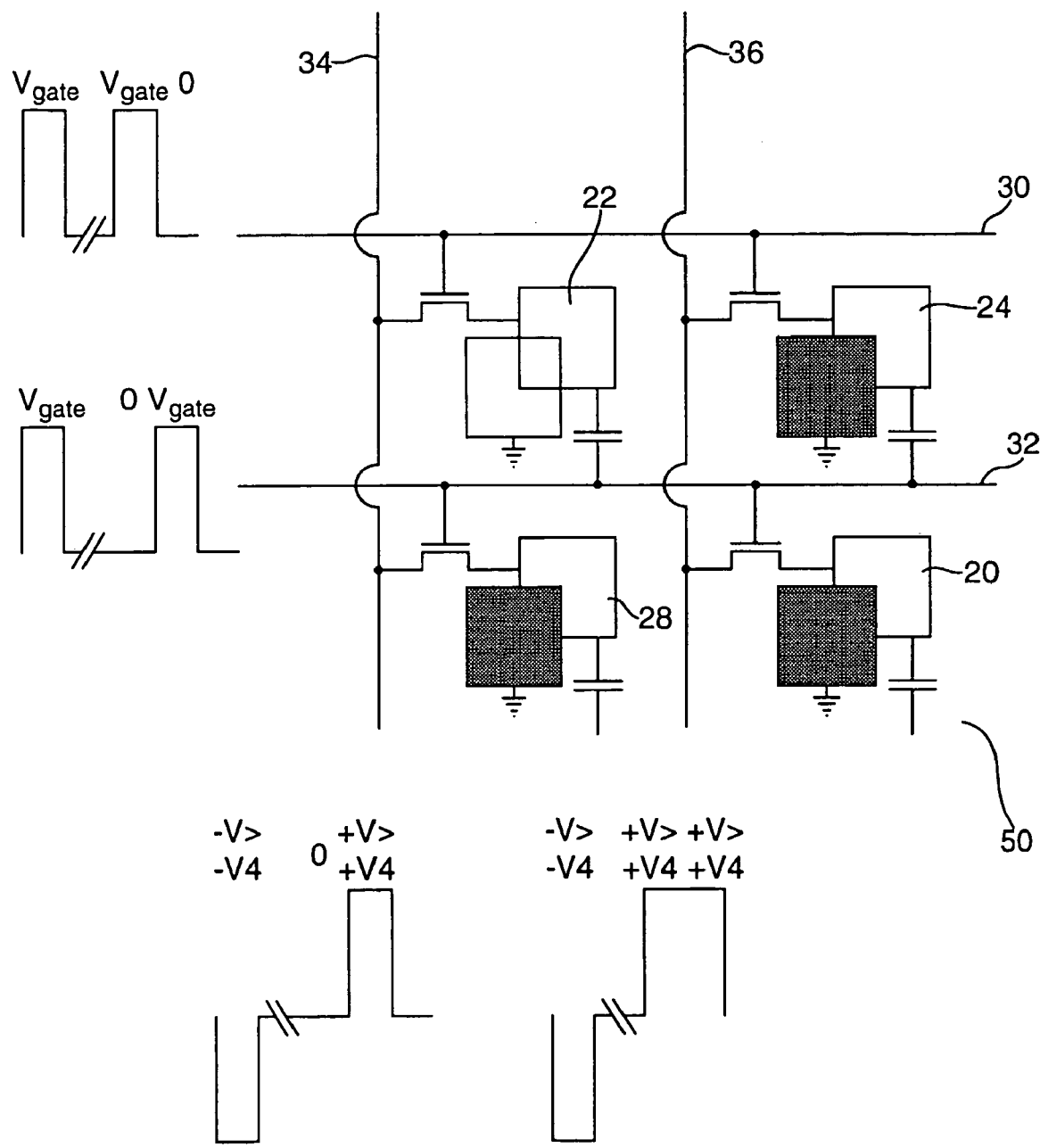

FIG. 5b) shows the active matrix addressing schemes required for operation of a dual mode device 50 according to this invention in image storage mode. Using the driving scheme shown in FIG. 5b, it can be seen that the pixel 22 is initially written into one bistable state (i.e. blanked) before a voltage is applied which latches the liquid crystal in to the other state. In storage mode, blanking may be done as for continuous mode, but the subsequent drive voltage required for pixels to be latched into the other state must surpass $\tau V3$ so that latching occurs. In the example shown in FIG. 5b, the column voltage in these pixels is higher than $\tau V4$ so that complete latching of the pixel is achieved.

For a device operating in storage mode, it may also be possible to give stored analogue greyscale. For example, a chirped grating structure could be used as described in Bryan-Brown et al, (1998) proceedings of Asia Display, p1051–1052. Sub-pixellation may also be provided to provide spatial dither. In fact, a person skilled in the art would recognise that techniques used to obtain analogue greyscale in a bistable device (e.g. exploitation of the partial switching region) could also be used to obtain grey-scale in a device according to this invention that is operating in storage mode. Similarly, it would be recognised by a person skilled in the art that temporal dither could be applied to provide grey-scale during continuous mode operation.

When operating in continual update mode, it is likely that a display according to this invention will be used in front-lit reflective mode. For storage mode, it is likely that the display will be required to operate in a reflective mode without any illumination to further conserve power. Therefore, the liquid crystal layer would ideally be tailored to operate in a reflective mode. However, and depending on the exact operating environment of the device, the device could also be optimised to work in transmission mode. Techniques of optimising a device for such purposes would be well known to a person skilled in the art.

In one embodiment of the invention, a single internal reflector polariser is provided, having an internal light controlling reflector with TFT deposited underneath the ZBD surface and a colour filter plate at the front surface. Alternatively, a specular reflective plate on the rear surface can be used in conjunction with a diffusive sheet at the front of the panel. Although the ZBD grating can be located on either the active or common plates, for ease of manufacture it may be preferable for the grating to be fabricated on the common plate. Alternatively, the required grating profile features may be fabricated simultaneously with one of the masked steps used in processing the TFT.

Referring to FIG. 6, a technique for passively addressing a ZBD test cell according to the present invention is shown. The test cell has a 1.5 µm cell gap, and is filled with the commercially available nematic liquid crystal material MLC 6204. Curve 60 shows the voltage required for a given duration of bi-polar pulse to fully latch the device from the defect (i.e. TN) state to the non-defect state, whilst curve 62 shows the onset of latching. A partial latching region 64 is thus defined.

As described above, passive matrix displays are typically constructed using stripes of row and column electrodes located on the upper and lower cell surfaces respectively. This provides a matrix of addressable pixel elements. The resultant voltage applied across the liquid crystal of a single pixel is then simply the difference of the voltages applied to the relevant column and row electrodes. Typically strobe waveforms are sequentially applied to rows, whilst data waveform (e.g. a select or non-select waveform) are sequentially applied to the columns. In this manner, each pixel in the display can be addressed (or multiplexed) in turn. Multiplexing techniques of this type are well known to those skilled in the art.

A strobe waveform can thus be combined with a variety of data waveforms in order to define the response of the particular pixel. Taking a 400 µs bi-polar strobe pulse of 11V amplitude, and combining it with −1V and +1V data pulses of a similar duration will produce a resultant voltage pulse at the relevant pixel of 12V (pt B of FIG. 6) and 10V (pt A of FIG. 6) respectively. For an identical strobe pulse, application of −2.7V and +2.7V data pulses will produce resultant voltage pulses at the relevant pixel of 13.7V (pt C of FIG. 6) and 8.3V (pt D of FIG. 6) respectively. It can thus be seen that data voltages of ±1V can be used to provide continuous mode operation (i.e. pt A and B) whilst data voltages of ±2.7V provide resultant pulses that provide select and non-select latching.

Figure 7:
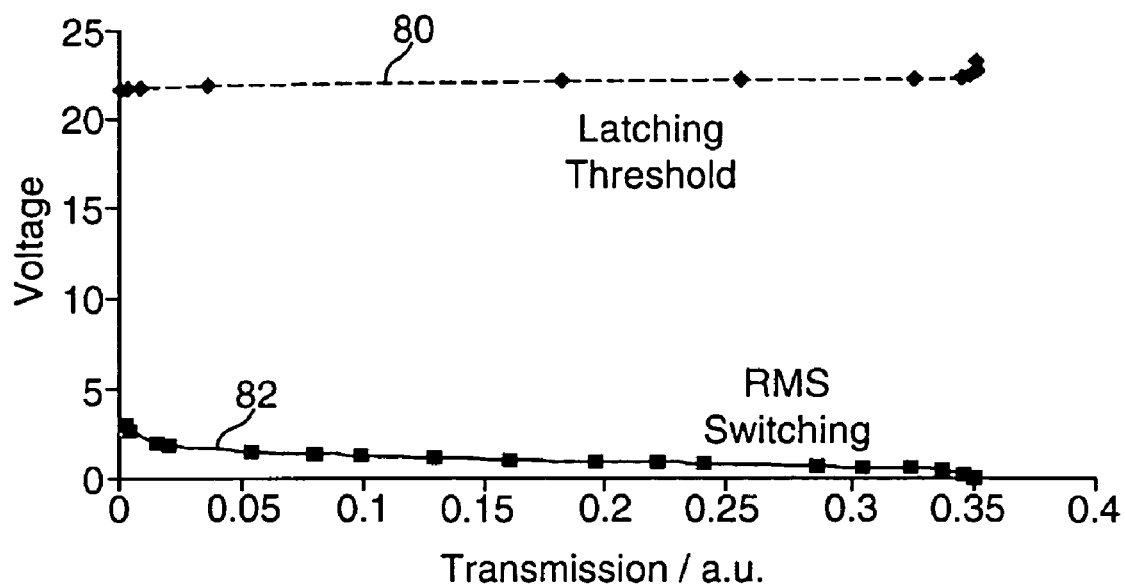
FIG. 7 shows a comparison of change in transmission of a ZBD test cell with applied RMS voltage and latching voltage.

Referring to FIG. 7, the change in transmission of a ZBD test cell formed using a bistable grating with a pitch of 0.9

μm is shown. The line 80 shows the change in transmission of the cell (in arbitrary units) with the application of various magnitude latching voltage pulses of 500 μs duration. The line 82 shows the change in transmission with applied RMS switching voltage. In both cases, the TN state was selected prior to taking the measurements.

Figure 8:
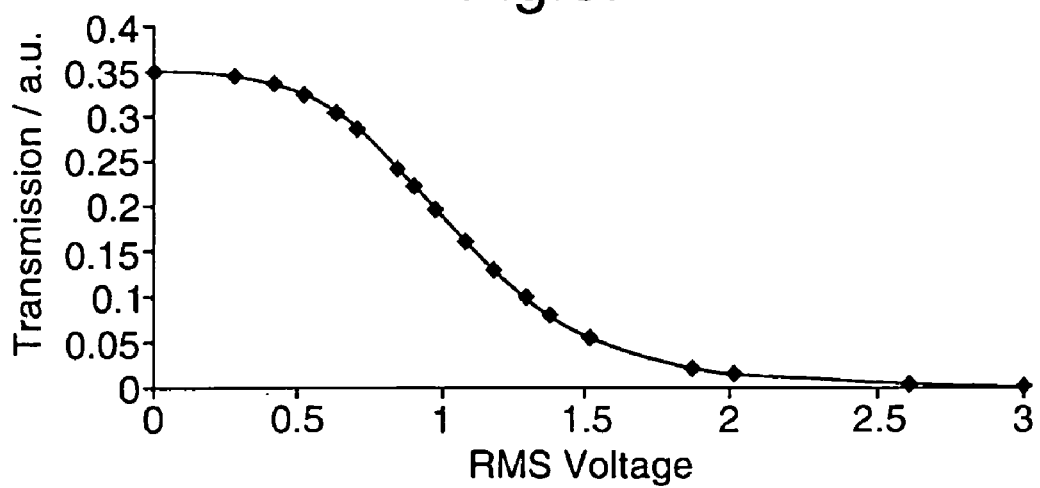
FIG. 8 shows transmission versus RMS voltage for the test cell described with reference to FIG. 7.

Referring to FIG. 8, the transmission (arbitrary units) versus RMS voltage data for the test cell described with reference to FIG. 7 is shown in an expanded view. It can thus be seen that 90% and 10% transmission will occur for this test cell with the application of RMS voltages of 0.7V (termed $V_{off}$) and 1.6V (termed $V_{on}$) respectively.

Taking the electro-optic response for continuous RMS switching shown with reference to FIGS. 7 and 8, the maximum number of lines that can be multiplexed ($n_{max}$) can be estimated using the expression:

$$n_{\max} = \frac{(V_{ON}^2 + V_{OFF}^2)^2}{(V_{ON}^2 - V_{OFF}^2)^2} \quad (1)$$

with the data $V_d$ and strobe $V_S$ signals approximately related by:

$$\frac{V_d}{V_S} = \frac{1}{\sqrt{n_{\max}}} \quad (2)$$

For the results shown in FIG. 8, equations (1) and (2) estimate $n_{max}=2$ and $V_d=0.71V_S$. For the continuous mode to operate without unwanted latching, the following condition will hold:

$$\tau_C(V_S+V_d) < \tau_S V_{th} \quad (3)$$

where $V_{th}$ is the threshold for the latching amplitude for a pulse of duration $\tau_S$, and $\tau_C$ is the duration of the continuous mode pulse.

Taking the results of FIG. 7 and choosing $\tau_C=\tau_S=500$ μs, then two rows may be addressed continuously (e.g. to show animation) without causing unwanted latching provided that $V_S<0.586V_{th}$. In this case ($V_{th}=22V$), $V_S=12.5$ V, $V_d=8.8V$ and the data required to latch into storage mode $V_D$ must be greater than 9.5V. It would be recognised that different voltages may be chosen by appropriate adjustment of $\tau_S$, $V_{th}$ and $V_S$.

Figure 9:
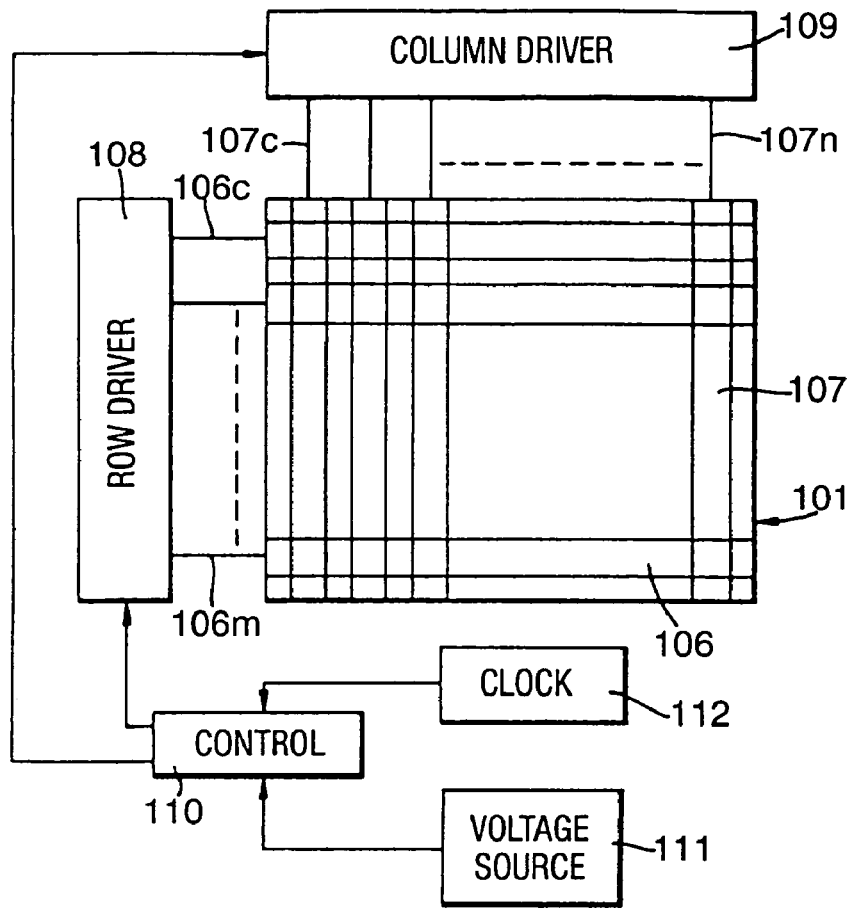
FIG. 9 shows a plan view of a matrix multiplexed liquid crystal display according to the present invention.
Figure 10:
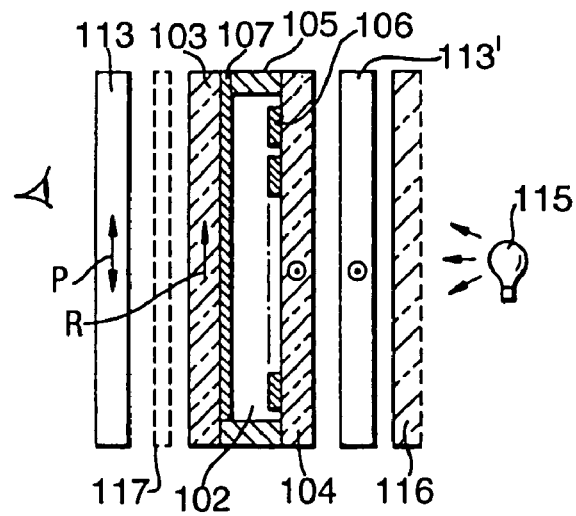
FIG. 10 shows the cross section of the display of FIG. 9.

Referring to FIGS. 9 and 10, a passively addressed display according to the present invention is shown.

The liquid crystal cell 101 is formed by a layer 102 of liquid crystal material contained between walls 103, 104 which may be any suitable material for instance glass and/or plastic. Silicon or metal could also be used if the device were to be operated in reflective mode. Spacers 105 distributed appropriately throughout the cell maintain the walls the required distance apart. Strip like row electrodes 106, which may be, for example $SnO_2$, indium tin oxide (ITO) or Aluminium, are formed on one wall 103 and similar column electrodes 107 are formed on the other wall 104. With m-row and n-column electrodes this forms an m×n matrix of addressable elements or pixels formed by the intersection of a row and a column electrode.

A row driver 108 supplies voltage to each row electrode 106. Similarly a column driver 109 supplies voltage to each column electrode 107. Control of applied voltages is carried out by control logic 110 connected to voltage source 111 and clock 112.

Either side of the cell are polarisers 113, 113' which may, depending on the particular liquid crystal arrangement, be placed with their polarisation axis substantially crossed with respect to one another and at an angle of substantially 45° to the alignment direction R, if any, on the adjacent wall 103, 104. Additionally one or more optical compensation layers 117 of, for example, stretched polymer may be added adjacent the liquid crystal layer 102 between cell wall and polariser. Of course, the skilled person will be aware of other embodiments that could be implemented using one polariser or no polarisers at all.

A partly reflecting mirror 116 may be arranged behind the cell 101 together with a light source 115. These allow the display to be seen in reflection and lit from behind in dull ambient lighting. For a transmissive device the mirror 116 may be omitted. Alternatively an internal reflecting surface may be used such as an internal Aluminium electrode.

Prior to assembly at least one of the cell walls 103, 104 are provided with a surface alignment grating to provide a bistable pretilt. The other surface may be provided with either a planar, tilted or homeotropic monostable surface or another bistable surface. The surface alignment grating structures providing bistable pretilt may be manufactured using a variety of techniques as described above.

Although the above embodiments disclose the use of a 90° twisted ZBD cell operating using a positive material, a person skilled in the art would immediately recognise that a plurality of alternative ZBD configurations could be used. For example, a cholesteric dopant could be added to the nematic liquid crystal material to induce a twist of greater than 90°. This gives an "STN-like" steep electro-optic switching threshold and enables a larger number of lines to be passively addressed in the continuous mode. For typical liquid crystal mixtures this would require less than 0.02% of cholesteric additive in the nematic host (usually giving d/P<1.25 where d=cell spacing, and P is the natural pitch of the nematic/cholesteric mixture).

A negative material could be used in conjunction with a homeotropic monostable surface; the blanking pulse should then chosen to latch into the non-defect state and the continuous mode will operate as a vertically aligned nematic (VAN) cell.

A planar (or tilted planar) monostable surface (e.g. a rubbed polymer) could also be used opposite a bistable surface alignment grating to provide a bistable device having a hybrid (non-defect) state and an untwisted planar (defect) state. A liquid crystal material having a positive or negative dielectric anisotropy could be used in this configuration. The cell spacing and liquid crystal birefringence could be tailored such that the hybrid state acts as a quarter wave-plate (i.e. provide optical retardation of λ/4), whilst the planar state acts as a half wave-plate (i.e. provides optical retardation of λ/4). The display could then be operated in transmission mode by placing it between crossed polarisers aligned at 45° to the alignment direction. Alternatively, a mirror and single polariser could be provided for reflective mode operation.

A skilled person would recognise that alternative ZBD devices could be provided, and that this invention is not only applicable to such ZBD devices. Devices having a plurality of stable configurations, and which are configured so that switching can also occur, can be operated in accordance with this invention.

The invention claimed is:

1. A liquid crystal device comprising, a layer of liquid crystal material disposed between two cell walls in an arrangement such that the liquid crystal material can adopt any one of two or more stable liquid crystal configurations that will persist in the absence of an applied electric field, the liquid crystal device being operable in two modes; a first mode in which application of an appropriate latching voltage pulse can select any one of the two or more stable liquid crystal configurations, and a second mode in which application of an electric field can switch the layer of liquid crystal material from a latched configuration to a switched configuration and in which the layer of liquid crystal material will return to said latched configuration when the applied electric field is removed.

2. A liquid crystal device according to claim 1 wherein the device is latched in to a particular stable configuration prior to operation in the second mode.

3. A liquid crystal device as claimed in claim 1 wherein the arrangement is such that the liquid crystal material can adopt any one of three or more stable liquid crystal configurations.

4. A liquid crystal device as claimed in claim 1 wherein the arrangement is such that the liquid crystal material can adopt any one of two stable liquid crystal configurations.

5. A liquid crystal device as claimed in claim 4, wherein a surface alignment grating is provided on the internal surface of at least one cell wall that is adapted to provide two stable liquid crystal configurations.

6. A liquid crystal device as claimed in claim 5 wherein the liquid crystal material comprises nematic liquid crystal material.

7. A liquid crystal device as claimed in claim 5 that comprises a surface alignment grating provided on the internal surface of the first cell wall and a planar surface treatment provided on the internal surface of the second cell wall, the arrangement being such that one of the stable liquid crystal configurations is a twisted nematic configuration.

8. A liquid crystal device, as claimed in claim 7 in which the twist of the liquid crystal material in the twisted nematic configuration is greater than 45°.

9. A liquid crystal device as claimed in claim 7 in which the twist of the liquid crystal material in the twisted nematic configuration is greater than 90°.

10. A liquid crystal device as claimed in claim 7 wherein the device is latched into the twisted nematic configuration prior to operation in the second mode.

11. liquid crystal device as claimed in claim 5 that comprises a surface alignment grating provided on the internal surface of the first cell wall and a homeotropic surface treatment provided on the internal surface of surface of the second cell wall, the arrangement being such that one of the stable liquid crystal configurations is a vertically aligned nematic configuration.

12. A liquid crystal device as claimed in claim 11 wherein the device is latched into the vertically aligned nematic configuration prior to operation in the second mode.

13. A liquid crystal device as claimed in claim 1 wherein the liquid crystal material comprises a nematic (or long pitch cholesteric) material.

14. A liquid crystal device as claimed in claim 13 wherein the liquid crystal material further comprises cholesteric liquid crystal material.

15. A liquid crystal device as claimed in claim 14, wherein the liquid crystal material comprises less than 0.02% by weight of cholesteric liquid crystal material.

16. A liquid crystal device as claimed in claim 14 wherein the ratio of liquid crystal layer thickness to the pitch of liquid crystal material is within the range of 0.25 to 1.25 inclusive.

17. A liquid crystal device as claimed in claim 1 wherein the liquid crystal material has a positive dielectric anisotropy.

18. A liquid crystal device as claimed in claim 1 wherein the liquid crystal material has a negative dielectric anisotropy.

19. A liquid crystal device as claimed in claim 1 wherein the cell walls comprise electrodes for applying an electric field to the liquid crystal, the electrodes being arranged to form a matrix of addressable pixels.

20. A liquid crystal device as claimed in claim 19 that comprises row electrodes formed on the first cell wall and column electrodes formed on the second cell wall, the first and second cell walls being arranged so as to define an array of passively addressable pixels.

21. A liquid crystal device as claimed in claim 19 that comprises a means of independently applying an electric field to each individual pixel.

22. A liquid crystal device as claimed in claim 21 wherein the means of independently applying an electric field to each individual pixel comprises a thin film transistor element.

23. A liquid crystal device as claimed in claim 22 wherein a storage capacitor is associated with each thin film transistor element.

24. A liquid crystal device as claimed in claim 19 which includes at least one discrete semiconductor circuit capable of addressing two or more pixels.

25. A liquid crystal device as claimed in claim 19 wherein the device is adapted such that the first mode of operation and the second mode of operation are capable of simultaneous use on different pixels or groups of pixels.

26. A liquid crystal device as claimed in claim 19 wherein pixels that are to be operated in the second mode are blanked into a predetermined stable liquid crystal configuration prior to operation in the second mode.

27. A liquid crystal device as claimed in claim 1 wherein the driving voltages applied to the device are substantially d. c. balanced over time.

28. A liquid crystal device as claimed in claim 1 wherein the second mode is adapted to display images at video rate.

29. A liquid crystal device as claimed in claim 1 wherein the second mode is adapted to display images with 256 grey-levels.

30. A liquid crystal device as claimed in claim 1 comprising at least one polariser to distinguish between different liquid crystal configurations.

31. A liquid crystal device as claimed in claim 1 wherein the device further comprises a reflective means and the device is configured to operate in reflective mode.

32. A liquid crystal device as claimed in claim 1 and additionally comprising colour filter elements.

33. A liquid crystal device as claimed in claim 1 and further comprising electronic means for selecting first mode or second mode operation.

34. An information display apparatus comprising a microprocessor unit adapted to electronically address a liquid crystal device according to claim 1.

35. A method of operating a liquid crystal device comprising the steps of; taking a liquid crystal device that is arranged such that the liquid crystal material can adopt any one of two or more stable liquid crystal configurations that will persist in the absence of an applied electric field, and determining whether to operate the device in a first mode or a second mode, whereby in the first mode of operation any one of the two or more stable liquid crystal configurations can be selected by application of an appropriate latching voltage, and in the second mode of operation the application of an electric field can switch the layer of liquid crystal material from a latched configuration to a switched configuration and in which the layer of liquid crystal material will return to said latched configuration when the applied electric field is removed.

36. A method as claimed in claim 35 in which the liquid crystal device comprises a plurality of pixels and in which only some of the pixels are operated in the second mode.

37. A method of operating a device as claimed in claim 35 whereby the liquid crystal material is latched in to a particular stable configuration prior to operation in the second mode.

38. A method of operating a zenithal bistable device as claimed in claim 35.

* * * * *